United States Patent
Brown

(10) Patent No.: US 6,845,781 B1
(45) Date of Patent: Jan. 25, 2005

(54) CARPETED FLOOR TENT

(75) Inventor: Todd A. Brown, Moon Township, PA (US)

(73) Assignee: Dick's Sporting Goods, Inc., Pittsburgh, PA (US)

( * ) Notice: Subject to any disclaimer, the term of this patent is extended or adjusted under 35 U.S.C. 154(b) by 57 days.

(21) Appl. No.: 10/167,779

(22) Filed: Jun. 10, 2002

(51) Int. Cl.⁷ .................. E04H 15/56; E04H 15/58
(52) U.S. Cl. ................ 135/117; 135/124; 135/116
(58) Field of Search ................ 135/124, 117, 135/116

(56) References Cited

U.S. PATENT DOCUMENTS

| | | | | |
|---|---|---|---|---|
| 579,373 A | * | 3/1897 | Wolbrecht | 135/120.4 |
| 620,719 A | * | 3/1899 | Nicholson | 135/125 |
| 1,260,612 A | * | 3/1918 | Whall | 135/95 |
| 1,820,412 A | * | 8/1931 | Warren | 135/119 |
| 2,516,869 A | * | 8/1950 | Harris | 135/126 |
| 2,907,056 A | * | 10/1959 | Kaplan | |
| 3,697,122 A | | 10/1972 | Richards | |
| 3,788,670 A | | 1/1974 | Petersen | |
| 3,857,749 A | * | 12/1974 | Yoshida | 428/80 |
| 4,063,566 A | | 12/1977 | Millerioux | |
| 4,144,899 A | * | 3/1979 | Kays | 135/138 |
| 4,305,414 A | * | 12/1981 | Bareis | |
| 4,519,410 A | * | 5/1985 | Kubacki | 135/93 |
| 4,579,762 A | * | 4/1986 | Ucci | 428/95 |
| 4,647,484 A | * | 3/1987 | Higgins | 428/40.4 |
| 4,702,950 A | * | 10/1987 | Slosberg et al. | |
| 4,827,958 A | * | 5/1989 | Cantwell et al. | |
| 5,059,463 A | * | 10/1991 | Peters | |
| 5,104,712 A | * | 4/1992 | Walters | 428/95 |
| 5,182,162 A | | 1/1993 | Andrusko | |
| 5,204,155 A | * | 4/1993 | Bell et al. | |
| 5,230,940 A | * | 7/1993 | Bohm et al. | 428/95 |
| 5,540,968 A | * | 7/1996 | Higgins | |
| 5,562,115 A | * | 10/1996 | Sotelo | |
| 5,612,113 A | * | 3/1997 | Irwin, Sr. | 428/95 |
| 5,630,846 A | | 5/1997 | Hara et al. | |
| 5,693,400 A | * | 12/1997 | Hamilton | |
| 5,948,500 A | * | 9/1999 | Higgins | |
| 6,060,145 A | * | 5/2000 | Smith et al. | 428/95 |
| 6,162,309 A | * | 12/2000 | Brodeur, Jr. et al. | |
| 6,203,881 B1 | * | 3/2001 | Higgins | |
| 6,344,254 B1 | * | 2/2002 | Smith et al. | 428/95 |
| 6,468,623 B1 | * | 10/2002 | Higgins | 428/95 |
| 6,745,788 B1 | * | 6/2004 | Brown | 135/117 |

FOREIGN PATENT DOCUMENTS

| | | | | |
|---|---|---|---|---|
| EP | 0 278 690 | * | 8/1988 | D06N/7/00 |
| JP | 5-171838 | * | 7/1993 | E04H/15/44 |
| JP | 8-142245 | * | 6/1996 | B32B/5/24 |

OTHER PUBLICATIONS http://www.undercovertent.net/accessories.htm, 5 pages Aug. 2001.*
http://www.thecampingsource.com/The%20Big%20List.htm, 6 pages Oct. 1999.*
http://www.comerainorshine.com/accessories.htm, 4 pages Aug. 2001.*
http://www.linoclntent.com/carpet.html, 1 page Dec. 2002.*
*Verlcro Product News*, published by Velcro USA, Inc., New York, NY, Aug. 1978 (4 pages).

* cited by examiner

*Primary Examiner*—Robert Canfield
(74) *Attorney, Agent, or Firm*—Hugh D. Jaeger

(57) ABSTRACT

A tent with a carpeted floor having a floor constructed of flexible PVC material backing and a fibrous material secured to the upper surface of the backing and extending upwardly from the backing to increase comfortableness by the addition of loft.

5 Claims, 6 Drawing Sheets

CARPETED FLOOR TENT

CROSS REFERENCES TO CO-PENDING APPLICATIONS

None.

BACKGROUND OF THE INVENTION

1. Field of the Invention

The present invention is for a tent, and more particularly relates to a tent having a carpeted floor.

2. Description of the Prior Art

Prior art tents include built-in floors extending between the lower edges of the tent panels to offer protection against moisture, water, insect infestation and the like. Often the material incorporated for floor usage is of thin material which is woven and coated to impart a waterproof but yet stiffer quality to the floor, or the floor is of single sheet plastic material. Either type floor or other floors known to the art often assume an undesirable noise-making quality or audible crinkling, rattling, rustling or other undesirable sound when physically disturbed or physically agitated, such as by being walked upon or when objects are moved on or slid across the floor. Such floors, being of thin construction, offer little resistance to cold from the earth underlying the tent floor from being transmitted through the tent floor to the interior of the tent or to a person sitting on the tent floor. Also, the shape of the terrain and irregular objects on the surface of the terrain such as sticks, stones or pebbles, for instance, can be felt through such thin tent floors, contributing much to the discomfort of a person sitting on the floor of the tent. Clearly what is needed is a tent which overcomes the disadvantages or prior art tents, by providing a tent with an improved and carpeted floor, especially with respect to comfort.

SUMMARY OF THE INVENTION

The general purpose of the present invention is to provide a carpeted floor tent where such carpeted floor tent enhances the comfort level of the user occupant. The carpeted floor tent includes support structure, a plurality of curved or planar side panels, one or more screen panels, a dew barrier, an entry door panel, a screen door panel, and a carpeted floor. In general, the carpeted floor includes a backing and a fibrous material secured to the backing to give the floor loft. More specifically, the carpeted floor is comprised of a flexible waterproof or water resistant material backing, preferably in sheet form, such as, but not limited to, flexible PVC (polyvinylchloride) material having non-woven loft enhancing fibrous material of soft carpet like fabric, pile, felt or other material suitably secured by such as bonding, sewing, welding, or other attachment methods to the upper surface of the backing to provide suitable loft or a comfort enhancing cushion extending above the backing. The fibrous material can be strands, tufts or other arrangements of flexible PVC, nylon, polyethylene or other suitable fiber. Various fibrous material having suitable loft heights, such as determined by the thickness of pile or felt or other material, can be provided for use with the backing and, if desired, an intermediate pad can also be included which locates between the backing and the fibrous material. The use of flexible PVC backing material, which in itself can be substantially thicker than ordinary thinly constructed sound generating tent floor materials, serves to reduce unwanted floor noise, as well as providing for reduction of the transmission of irregularly shaped images through the tent floor and increasing the insulative value therethrough. The addition of fiber material to the backing further reinforces the desirable attributes just described by providing increased overall thickness of the tent floor. The increased loft provides an overall more comfortable tent floor by providing a desirable cushioning quality, as well as a desirable insulative quality. The PVC backing and the fiber material provide a tough and durable tent floor. The fiber material also serves to act as a buffer between the hard soles of shoes, camp stools, cots or other items and the upper surface of the flexible PVC backing, thereby offering abrasion protection therebetween to deter wearing of the backing and to provide a more durable tent floor.

According to one embodiment of the present invention, there is provided a carpeted floor tent having a floor constructed of flexible PVC backing having a fibrous material of soft carpet-like fabric extending upwardly therefrom.

One significant aspect and feature of the present invention is a tent having a carpeted floor.

Still another significant aspect and feature of the present invention is a carpeted floor tent having a carpeted floor with backing and a soft carpet-like fibrous material extending upwardly therefrom to improve comfort.

Another significant aspect and feature of the present invention is a carpeted floor tent wherein the carpeted floor improves comfort, improves insulation from the underlying earth, and decreases floor noise.

Yet another significant aspect and feature of the present invention is a carpeted floor tent wherein the carpeted floor enhances floor durability.

A further significant aspect and feature of the present invention is a carpeted tent floor which is waterproof.

Yet another significant aspect and feature of the present invention is a carpeted floor for a tent which can be incorporated into an original tent design or can be added onto an existing tent.

Having thus described embodiments of the present invention, it is the principal object of the present invention to provide a tent with a carpeted floor.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DETAILED DESCRIPTION OF THE PREFERRED EMBODIMENTS

Figure 1:
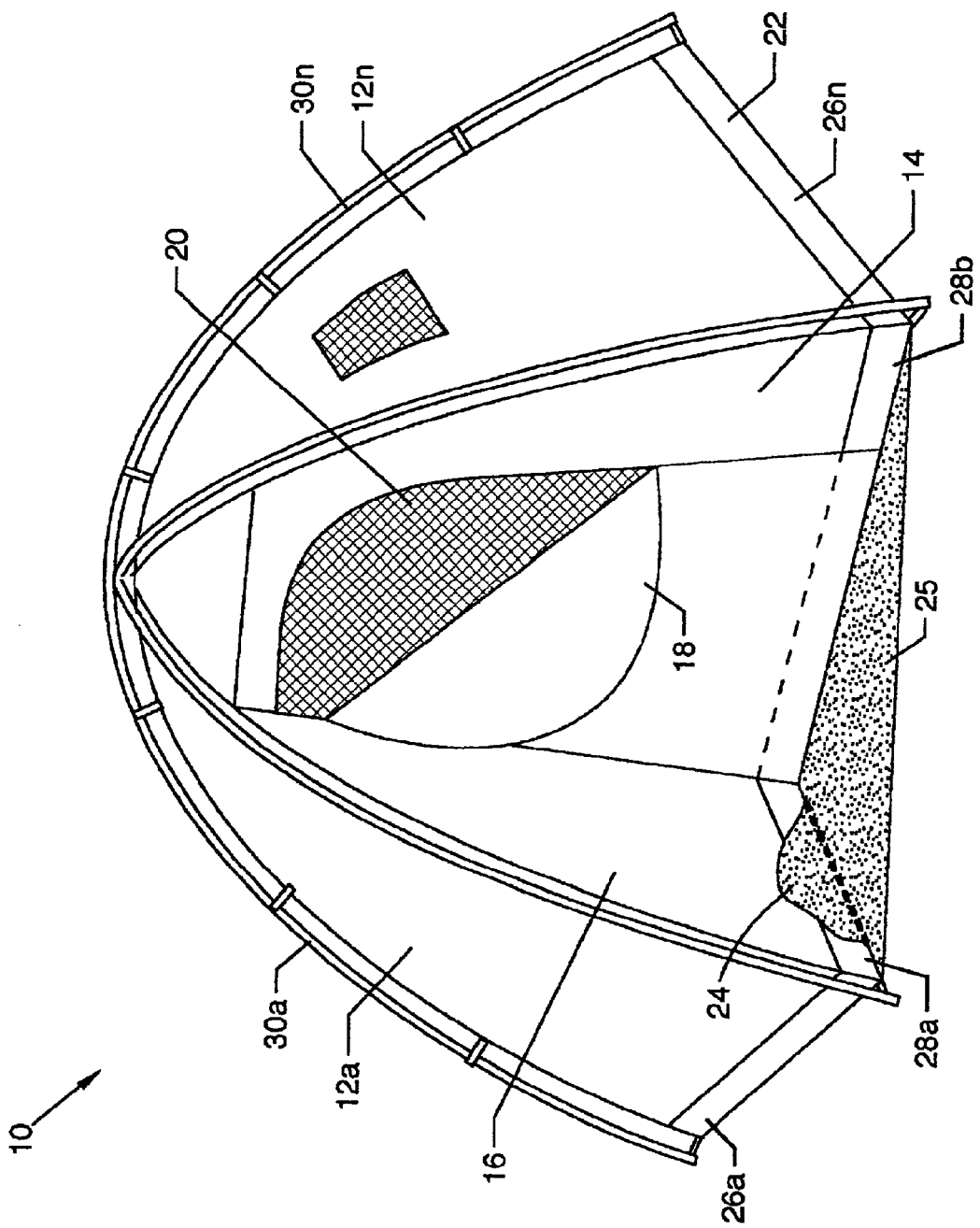
FIG. 1 illustrates a partial cutaway view of the carpeted floor tent, the present invention.

FIG. 1 illustrates a carpeted floor tent 10, the present invention, in partial cutaway. The carpeted floor tent 10 is comprised of components including, but not limited to, structures as now described herein. A plurality of full or shortened and connected curved fabric panels 12a–12n of suitable material adjoin and abut a substantially planar and connected fabric entry door panel surround 14 and a connected substantially planar and connected fabric panel 16. A fabric entry door panel 18 and a co-located screen door panel 20 are located on the entry door panel surround 14. The entry door panel surround 14 also extends parallel and in close juxtaposition to and behind the lower region of the fabric entry door panel 18. A dew barrier 22 is located along and about the lower regions of the curved fabric panels 12a–12n, planar fabric panel 16 and the planar entry door panel surround 14. A carpeted floor 24 secures and extends between a plurality of lower edges 26a–26n of the curved fabric panels 12a–12n and the lower edges 28a–28b of the planar fabric panel 16 and the entry door panel surround 14, respectively, each of which can co-locate with the lower regions of the dew barrier 22. Optionally, a vestibule 25 as an extension of the carpeted floor 24 can be securingly located along and between the lower edge 28b of the entry door panel surround 14 and the lower edge 28a of the planar fabric panel 16. A series of support poles 30a–30n directly or indirectly support the curved fabric panels 12a–12n, the entry door panel surround 14, the entry door panel 18, the screen door panel 20, and the planar fabric panel 16.

FIGS. 2–6 illustrate various compositions of the carpeted floor 24 in the form of alternative embodiments, including carpeted floors 24a, 24b, 24c, 24d and 24e each of which utilizes a PVC backing 32 and in most cases an adhesive 34 combined with different fibrous materials to form a carpeted floor 24 such as utilized with reference to FIG. 1.

Figure 2:
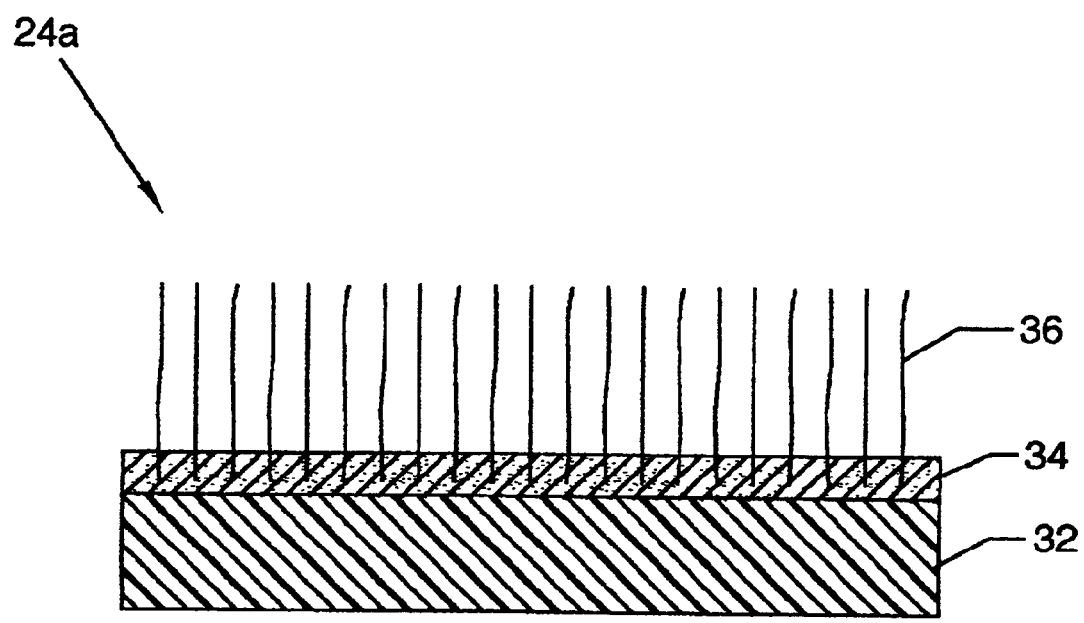
FIG. 2, a preferred embodiment, is a cross section view of the composition of the carpeted floor.

FIG. 2 is a depiction in cross section view of the composition of the carpeted floor 24, herein designated as carpeted floor 24a. A flexible waterproof or water resistant material such as, but not limited to, a single layer sheet of flexible PVC (polyvinylchloride) backing 32 serves as a base for the carpeted floor 24a as well as for the carpeted floors 24b–24e shown in the following figures. A layer of adhesive 34, also shown in the following figures, is applied to the upper surface of the PVC backing 32 to embed the lower portions of the fibrous material 36 and to bond the lower portions of the fibrous material 36 to the PVC backing 32 while leaving the upper portions of the fibrous material 36 extended well above the adhesive 34 and the PVC backing 32 to provide loft or thickness. The fibrous material 36 can be soft carpet-like fabric, such as strands, tufts, loops or other arrangements of flexible PVC, nylon, polyethylene or other suitable fiber.

Figure 3:
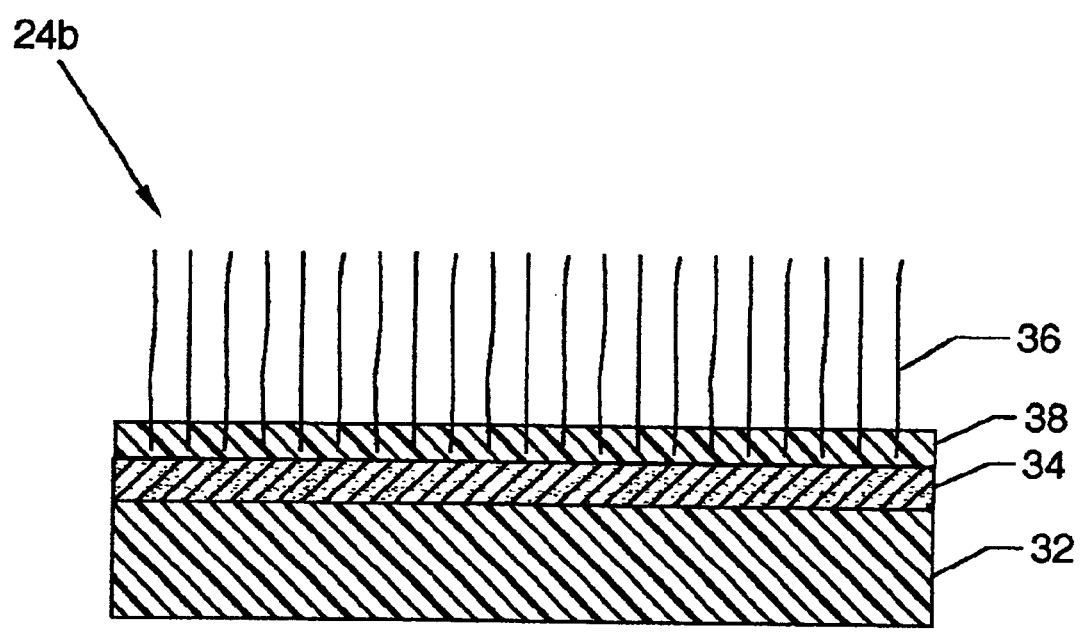
FIG. 3, a first alternative embodiment, is a cross section view of the composition of the carpeted floor.

FIG. 3, a first alternative embodiment, is a depiction in cross section view of the composition of the carpeted floor 24b where the fibrous material 36 is provided being embedded in a flexible sub-backing 38 in a separate process and mated to the PVC backing 32 described with reference to FIG. 2, which serves as a base for the carpeted floor 24b. A layer of adhesive 34 applied to the upper surface of the PVC backing 32 bonds the sub-backing 38 to the PVC backing 32, while the upper portions of the fibrous material 36 extend well above the sub-backing 38 and the PVC backing 32 to provide loft.

Figure 4:
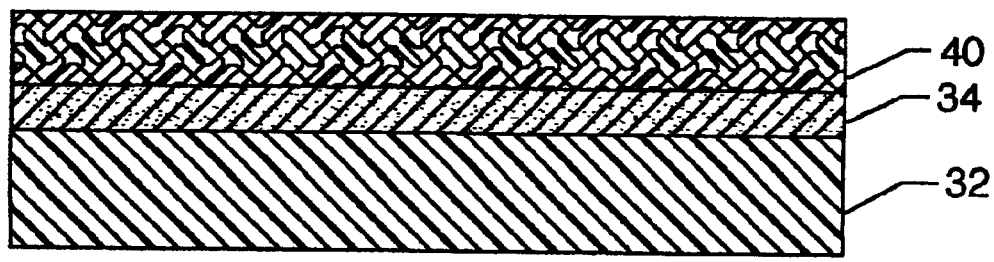
FIG. 4, a second alternative embodiment, is a cross section view of the composition of the carpeted floor.

FIG. 4, a second alternative embodiment, is a depiction in cross section view of the composition of the carpeted floor 24c where felt 40, another fibrous material, is mated to the PVC backing 32 described with reference to FIG. 2 which serves as a base for the carpeted floor 24c. A layer of adhesive 34 applied to the upper surface of the PVC backing 32 bonds the felt 40 to the PVC backing 32, while the fibrous felt 40 extends above the PVC backing 32 to provide a dense loft.

Figure 5:
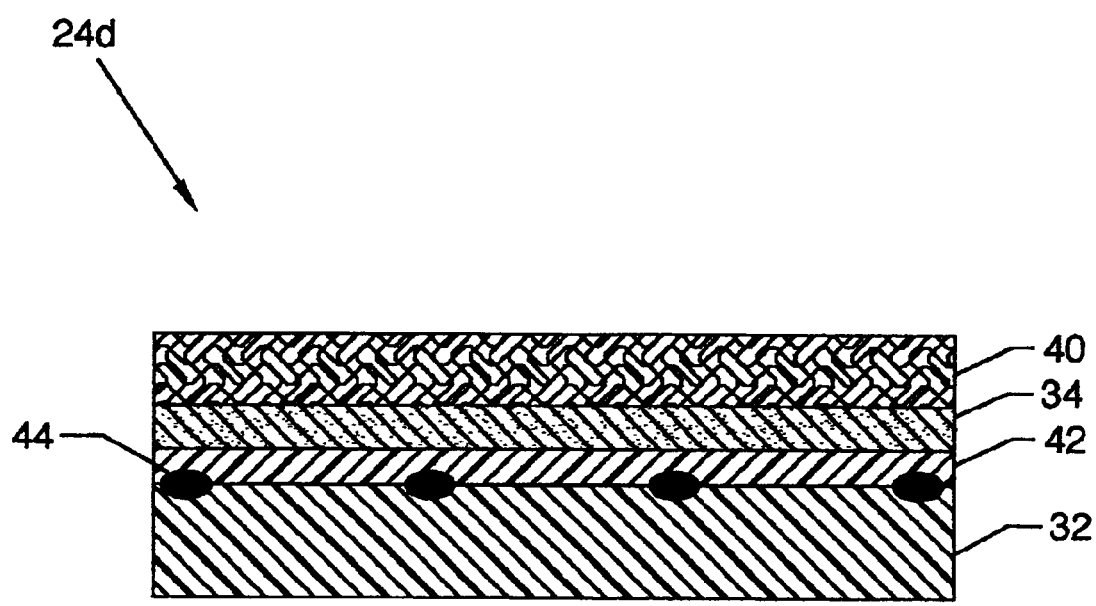
FIG. 5, a third alternative embodiment, is a cross section view of the composition of the carpeted floor; and, FIG. 6, a fourth alternative embodiment, is a cross section view of the composition of the carpeted floor.

FIG. 5, a third alternative embodiment, is a depiction in cross section view of the composition of the carpeted floor 24d where felt 40, another fibrous material, is provided being adhesively attached to a flexible sub-backing 42 in a separate process and then mated such as by a plurality of electronic weldments 44 to the PVC backing 32 described with reference to FIG. 2 which serves as a base for the carpeted floor 24d. Prior to electronic welding, a layer of adhesive 34 is applied to the upper surface of the sub-backing 42 to bond the sub-backing 42 to the felt 40. The fibrous felt 40 extends above the PVC backing 32 to provide a dense loft.

Figure 6:
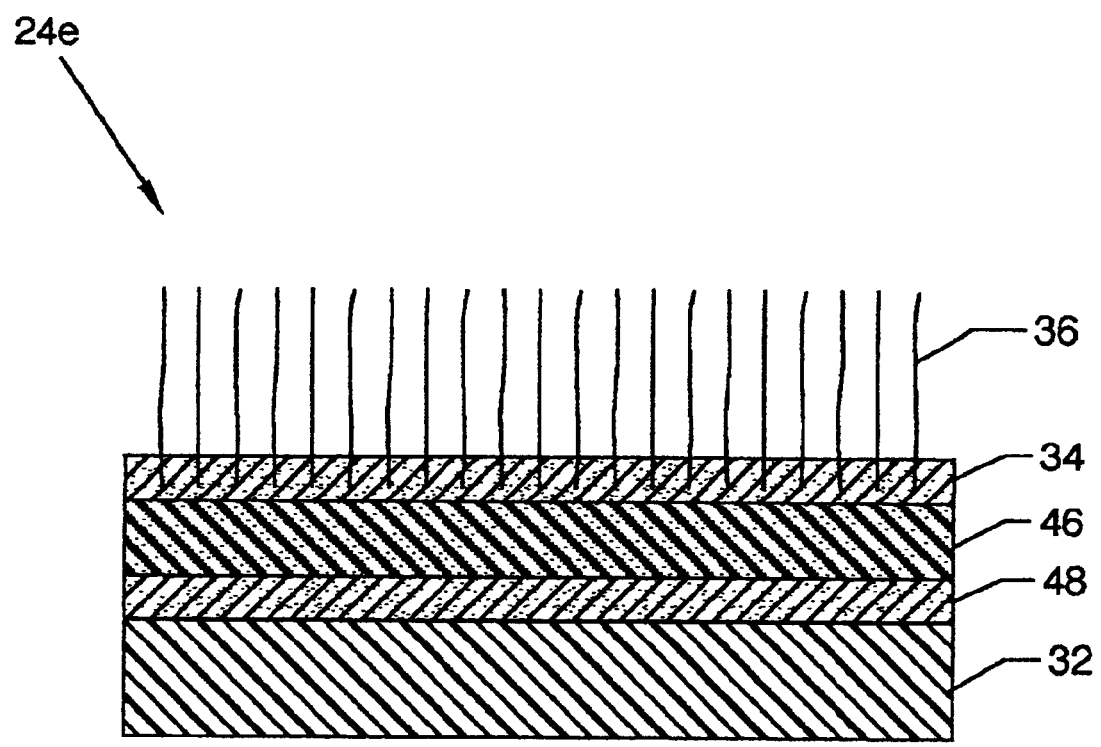

FIG. 6, a fourth alternative embodiment, is a depiction in cross section view of the composition of a carpeted floor 24e incorporating a pad 46, disposed between the fibrous material 36 and the PVC backing 32 of the carpeted floor 24a for yet additional comfort. Pad 46 is preferably foam, but can be of any other suitable material. Adhesive 48 applied to the upper surface of the PVC backing 32 bonds the PVC backing 32 to the pad 46. Adhesive 34 and fibrous material 36 is applied in the same manner and fashion to the upper surface of the pad 46 as previously described with reference to FIG. 2. The pad 46 can also be incorporated into use with the carpeted floors 24b and 24d to provide greater comfort.

MODE OF OPERATION

The carpeted floor 24, as previously described, can be incorporated into the design of a tent to produce a carpeted floor tent. The carpeted floor 24 can be provided in several forms consistent with the teachings of the invention, as evidenced by the preferred and alternate embodiments. The carpeted floor 24 can be used as an original floor to produce a carpeted floor tent or can be suitably installed over an existing tent floor to take advantage of the comfortable qualities and other desirable qualities provided by such a carpeted floor 24.

Various modifications can be made to the present invention without departing from the apparent scope hereof.

PARTS LIST

| | | | |
|---|---|---|---|
| 10 | carpeted floor tent | 42 | sub-backing |
| 12a–n | curved fabric panels | 44 | weldments |
| 14 | entry door panel surround | 46 | pad |
| 16 | planar fabric panel | 48 | adhesive |
| 18 | entry door panel | | |
| 20 | screen door panel | | |
| 22 | dew barrier | | |
| 24 | carpeted floor | | |
| 24a–e | carpeted floors | | |
| 25 | vestibule | | |
| 26a–n | lower edges | | |
| 28a–b | lower edges | | |
| 30a–n | support poles | | |
| 32 | PVC backing | | |
| 34 | adhesive | | |
| 36 | fibrous material | | |
| 38 | sub-backing | | |
| 40 | felt | | |

I claim:

1. A carpeted floor tent comprising:

a support structure;

a plurality of connected side panels supported by the support structure;

the plurality of connected side panels including a plurality of curved side panels and a planar panel;

an entry door panel interposed between the planar side panel and a curved panel of the plurality of curved side panels;

a screen door panel co-located with the entry door panel;

a dew barrier located along and about lower regions of the plurality of connected side panels and entry door panel; and a carpeted floor.

2. The tent of claim 1, wherein the entry door panel is carried on an entry door surround, the entry door surround being connected to the planar side panel and one of the curved side panels of the plurality of curved side panels.

3. The tent of claim 2, wherein the entry door panel is carried on the entry door surround by a zipper.

4. The tent of claim 3, wherein the screen door panel is carried on the entry door panel by a zipper.

5. The tent of claim 1, wherein the planar side panel and the entry door panel define a vestibule exterior to the tent and the carpeted floor extends into the vestibule.

* * * * *